US012640058B2

(12) United States Patent
Boissy et al.

(10) Patent No.: US 12,640,058 B2
(45) Date of Patent: May 26, 2026

(54) SYSTEM FOR SIMULATING THORACIC CAGE AND LUMBAR SPINE REGION

(71) Applicant: SOCIETE DE COMMERCIALISATION DES PRODUITS DE LA RECHERCHE APPLIQUEE SOCPRA SCIENCES SANTE ET HUMAINES S.E.C., Sherbrooke (CA)

(72) Inventors: Patrick Boissy, Sherbrooke (CA); Mathieu Hamel, Magog (CA); Karina Lebel, Sherbrooke (CA); Philippe-Olivier Provost, Sherbrooke (CA)

(73) Assignee: SOCIETE DE COMMERCIALISATION DES PRODUITS DE LA RECHERCHE APPLIQUÉE SOCPRA SCIENCES SANTÉ ET HUMAINES S.E.C., Sherbrooke (CA)

( * ) Notice: Subject to any disclaimer, the term of this patent is extended or adjusted under 35 U.S.C. 154(b) by 257 days.

(21) Appl. No.: 18/557,701

(22) PCT Filed: Apr. 27, 2022

(86) PCT No.: PCT/CA2022/050635
§ 371 (c)(1),
(2) Date: Oct. 27, 2023

(87) PCT Pub. No.: WO2022/226640
PCT Pub. Date: Nov. 3, 2022

(65) Prior Publication Data
US 2024/0221540 A1 Jul. 4, 2024

Related U.S. Application Data

(60) Provisional application No. 63/180,136, filed on Apr. 27, 2021.

(51) Int. Cl.
*G09B 23/32* (2006.01)

(52) U.S. Cl.
CPC ..................................... *G09B 23/32* (2013.01)

(58) Field of Classification Search
CPC ....................................................... G09B 23/32
See application file for complete search history.

(56) References Cited

U.S. PATENT DOCUMENTS

| | | |
|---|---|---|
| 3,753,302 A | 8/1973 | Daniel |
| 2013/0330698 A1 | 12/2013 | Yang et al. |
| 2017/0053564 A1* | 2/2017 | Triano ..................... G09B 5/02 |

FOREIGN PATENT DOCUMENTS

| | | |
|---|---|---|
| CN | 110838258 | 2/2020 |
| EP | 2871631 B1 | 8/2018 |
| WO | 2019/075582 A1 | 4/2019 |

* cited by examiner

*Primary Examiner* — Kesha Frisby
(74) *Attorney, Agent, or Firm* — NORTON ROSE FULBRIGHT CANADA LLP

(57) ABSTRACT

A lumbar spine mechanism for a mannequin may include three or more joint units serially connected to provide joints for three or more rotational degrees of freedom (DOF). A rotational axis of a first DOF is configured to be aligned with a lateral axis of the mannequin. A rotational axis of a second DOF is configured to be aligned with an anterior-posterior axis of the mannequin. A rotational axis of a third DOF is configured to be aligned with a cranial-caudal axis of the mannequin. Sensors measure movements at each of the joint units to detect lumbar spine orientation changes. A bottom one of the joint units is adapted to be connected to a pelvis of the mannequin, and a top one of the joint units is adapted to be connected to a torso section of the mannequin.

20 Claims, 18 Drawing Sheets

PROCESSOR

SYSTEM FOR SIMULATING THORACIC CAGE AND LUMBAR SPINE REGION

CROSS-REFERENCE TO RELATED APPLICATION

The present application claims the priority of U.S. Patent Application No. 63/180,136, filed on Apr. 27, 2021 and incorporated herein by reference.

TECHNICAL FIELD

The present disclosure pertains to a system for emulating a chest portion, a lumbar spine region, and a lower body portion in a mannequin (a.k.a., manikin) or dummy, for simulating reanimation and maneuvering techniques.

BACKGROUND OF THE ART

Mannequins, also known as dummies or manikins, are commonly used for training purposes or for research. Mannequins emulate a human body and interventions made on the mannequin can be evaluated, to train maneuvering personnel. It remains a challenge for the mannequins to be as realistic as possible, to allow trained personnel to translate practice skills to real-life situations, for actions such as cardiopulmonary resuscitation (CPR), transfer maneuvers, etc. The lack of realism may also be found in the weight distribution, center of mass, and freedom of movements of limbs of the mannequin, with known mannequins failing to provide biomechanic fidelity.

SUMMARY

It is an aim of the present disclosure to provide a novel system for simulating lumbar spine motions.

It is a further aim of the present disclosure to provide a system for simulating a chest in cardiopulmonary resuscitation maneuvers.

Therefore, in accordance with a first aspect of the present disclosure, there is provided a lumbar spine mechanism for a mannequin comprising: at least three joint units serially connected to provide joints for at least three rotational degrees of freedom (DOF), with a rotational axis of a first DOF configured to be aligned with a lateral axis of the mannequin, a rotational axis of a second DOF configured to be aligned with an anterior-posterior axis of the mannequin, and a rotational axis of a third DOF configured to be aligned with a cranial-caudal axis of the mannequin, sensors to measure movements at each of the at least three joint units to detect lumbar spine orientation changes, and wherein a bottom one of the at least three joint units is adapted to be connected to a pelvis of the mannequin, and a top one of the at least three joint units is adapted to be connected to a torso section of the mannequin.

Still further in accordance with the first aspect, for example, the bottom one of the at least three joint units is adapted to be connected to the pelvis of the mannequin with the third DOF.

Still further in accordance with the first aspect, for example, four of said joint units may provide concurrently four rotational DOFs, wherein a rotational axis of a fourth DOF is configured to be aligned with the lateral axis of the mannequin.

Still further in accordance with the first aspect, for example, the joint units for the first DOF and for the second DOF are defined by a pair of U-shaped brackets pivotally connected at ends of the U, with cavities of the U facing each other.

Still further in accordance with the first aspect, for example, the U-shaped brackets include three welded plates forming the U.

Still further in accordance with the first aspect, for example, the sensors associated with the first DOF and with the second DOF are within the cavities of the U.

Still further in accordance with the first aspect, for example, a pair of adjacent ones of the joint units share a base of the respective U-shaped brackets.

Still further in accordance with the first aspect, for example, a base of the respective U-shaped brackets for at least one of the joint units defines a bore used as a foramen for cables of the sensors.

In accordance with the first aspect of the present disclosure, there is provided a system for simulating lumbar spine motions, the system comprising: a mannequin having a lumbar spine mechanism as described above between a torso and a pelvis; a processing unit having an orientation calculator module to quantify the lumbar spine orientation changes from readings of the sensors, and a performance assessor module to assess the lumbar spine motions using the quantified lumbar spine orientation changes; and an output for outputting an assessment and/or the lumbar spine orientation changes.

In accordance with a second aspect of the present disclosure, there is provided a spine mechanism for a mannequin comprising: at least three joint units serially connected to provide joints for at least three rotational degrees of freedom (DOF), with a rotational axis of a first DOF configured to be aligned with a lateral axis of the mannequin, a rotational axis of a second DOF configured to be aligned with an anterior-posterior axis of the mannequin, and a rotational axis of a third DOF configured to be aligned with a cranial-caudal axis of the mannequin, and sensors to measure movements at each of the at least three joint units, and wherein the joint units for the first DOF and for the second DOF are defined by a pair of U-shaped brackets pivotally connected at ends of the U, with cavities of the U facing each other, the U-shaped brackets include three welded plates forming the U.

Further in accordance with the second aspect, for example, four of said joint units may provide concurrently four rotational DOFs, wherein a rotational axis of a fourth DOF is configured to be aligned with the lateral axis of the mannequin.

Still further in accordance with the second aspect, for example, the sensors associated with the first DOF and with the second DOF are within the cavities of the U.

Still further in accordance with the second aspect, for example, a pair of adjacent ones of the joint units share a base of the respective U-shaped brackets.

Still further in accordance with the second aspect, for example, a base of the respective U-shaped brackets for at least one of the joint units defines a bore used as a foramen for cables of the sensors.

In accordance with a third aspect of the present disclosure, there is provided a torso system for a mannequin comprising: a structural member at a back of the mannequin; ribs connected to the structural member to define a ribcage, at least a first set of the ribs having pivotable portions relative to the structural member; a chest plate assembly operatively connected to the ribcage for relative movement therebetween; and a shock unit between the chest plate assembly and the structural member.

Further in accordance with the third aspect, for example, the ribs of the first set each have a posterior rib member connected to the structural member, and an anterior rib member pivotally connected to the respective posterior rib member, the anterior rib members being connected to the chest plate assembly.

Still further in accordance with the third aspect, for example, the anterior rib members are connected to the chest plate assembly by joints including one translational DOF and one rotation DOF.

Still further in accordance with the third aspect, for example, the anterior rib member and the posterior rib member of a left subset of the first set share a common pivot, and the anterior rib member and the posterior rib member of a right subset of the first set share a common pivot.

Still further in accordance with the third aspect, for example, the anterior rib members of the left subset share a common pivot for connection to the chest plate assembly, the anterior rib members of the right subset share a common pivot for connection to the chest plate assembly.

Still further in accordance with the third aspect, for example, the chest plate assembly has a frame member operatively connected to the ribcage.

Still further in accordance with the third aspect, for example, the frame member covered by a membrane emulating soft tissue.

Still further in accordance with the third aspect, for example, the structural member includes an arched beam to which the ribcage is connected.

Still further in accordance with the third aspect, for example, the ribs of a second set are fixed.

Still further in accordance with the third aspect, for example, an airway simulator apparatus may have at least one tube defining at least one opening at a level of a face of the mannequin, and being in fluid communication with at least one airbag in the chest plate assembly.

Still further in accordance with the third aspect, for example, a pressure sensor may be in the airway simulator apparatus.

Still further in accordance with the third aspect, for example, rotational axes may be connected to the structural member, and configured for connection of arms to the torso system.

DETAILED DESCRIPTION

Figure 1:
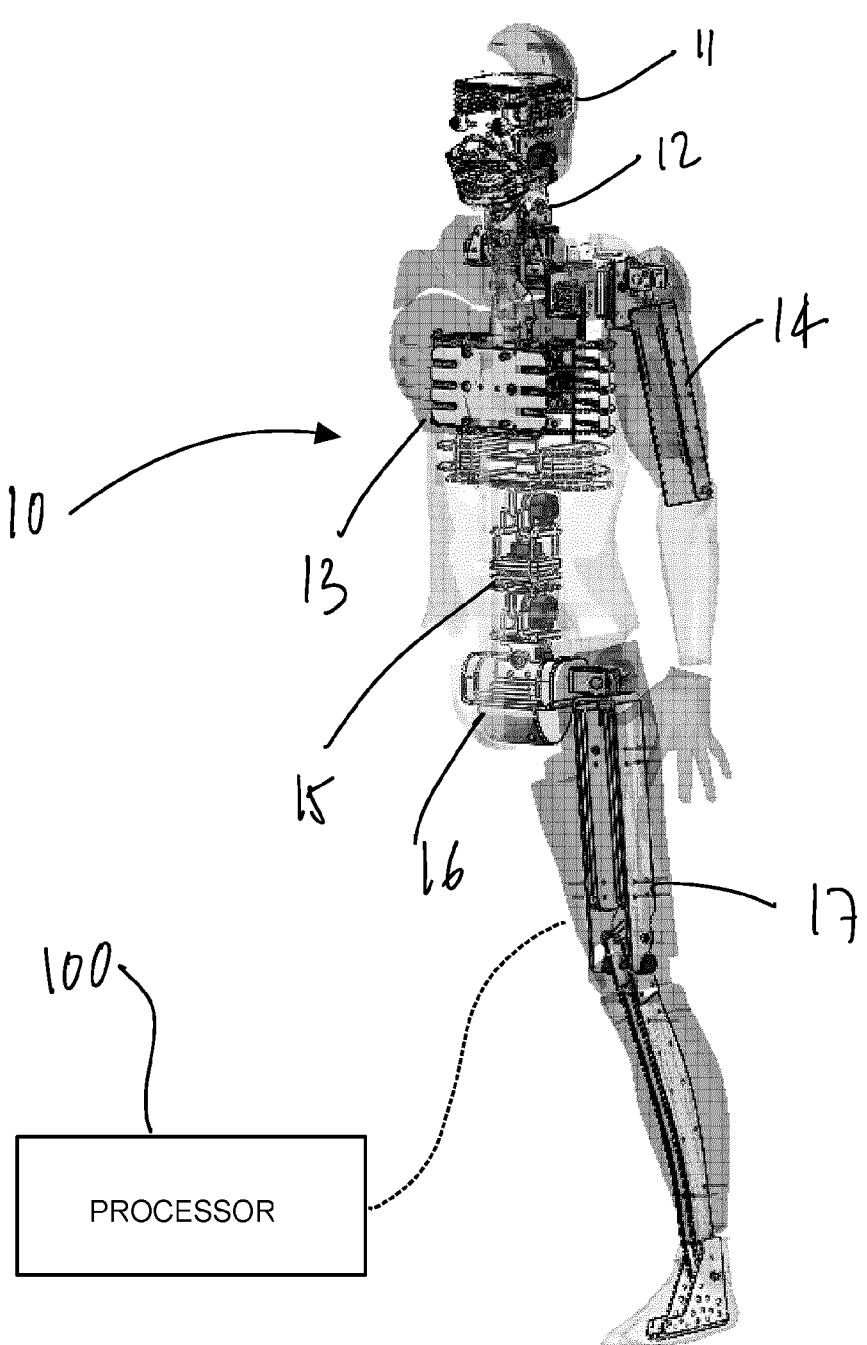
FIG. 1 is a perspective view, partly transparent, of a mannequin in accordance with embodiments of the present disclosure.

Referring to the drawings and more particularly to FIG. 1, a mannequin in accordance with the present disclosure is generally shown at 10. The mannequin 10 may also be known as a dummy, a manikin, etc. The mannequin 10 may have various portions, some of which are described herein in further detail as part of the present disclosure. The present disclosure focuses on some skeletal parts of the mannequin 10, whereby soft-tissue surrounding the skeletal parts is only shown in transparent layers in FIG. 1. However, as observed in FIG. 1, numerous of the skeletal parts are embedded in soft-tissue emulating muscles, tendons, and/or skin. The mannequin 10 may have a head 11, a neck 12 and a torso 13. The head and the neck may be as described in PCT Application Publication No. WO 2019/075582, incorporated herein by reference, as a possibility among others. However, the neck 12 may have a spine configuration using a spine portion described herein, in a variant. One arm 14 is shown projecting from the torso 13. A similar other arm may be on the other side, though removed from FIG. 1 for simplicity. A lumbar spine portion 15 projects downwardly from the torso 13 and interfaces a pelvis 16 to the lumbar torso 13. Legs 17 project downwardly from the pelvis 16, though a single one is shown in the figures for simplicity. The various parts of the mannequin body may be articulated so as to emulate the human body.

Referring now to FIGS. 2-8, a torso system in accordance with the present disclosure is generally shown at 20. The torso system 20 is configured to allow simulated reanimation procedures, such as CPR, for example, when chest compresses are effected on the torso system 20, with artificial ventilation. The torso system 20 may be used to provide a user with the appropriate force-feedback feeling of a human body exposed to such maneuvers. The torso system 20 may also be equipped with sensors to quantify the interventions on the mannequin 10, and hence provide feedback based on the actual maneuvers by the operators of the torso system 20. Hence, the torso system 20 is configured to simulate a reaction of a human body, with elasticity and resilience, weight distribution and center of mass positioning.

The torso system 20 has a main structural member 21. The main structural member 21 may be a beam, with a slight curvature as an option. The main structural member 21 is positioned in the mannequin 10 where the spine would be, i.e., generally centered in the back of the torso system 20. The structural member 21 is shown as being a single structural component. In an embodiment, the structural member could be constituted of separate vertebrae, in a similar manner as described below for the lumbar spine system. The structural member 21 is described as being structural, in that it is load bearing, in supporting various other parts of the torso system 20, and as it interconnects to other parts of the mannequin 10, as described herein.

At an upper end of the structural member 21, connector portions 21A are provided for interfacing the neck 12 and arms 14 to the torso system 20. The connector portions 21A may include plates, brackets, struts, beams, fasteners, etc, and have suitable structural integrity to preserve their shape in spite of forces applied to the torso system 20 and of transfer maneuvers of the mannequin 10. There may be multiple connector portions 21A of various types, in various arrangements, to connect the neck 12 and the arms 14 to the torso system 20.

At an opposite end of the structural member 21, a base plate 21B is provided. The base plate 21B is one possible structural component that may be used to connect the torso system 20 to an adjacent system. Other base components could include beams, brackets, blocks, rods, beam, etc. In an embodiment, adjacent systems (e.g., lumbar spine system) are continuously connected to the beam or spine of the torso system 20, such as defined by the structural member 21, instead of being interfaced to the base plate 21B. Weights 21C may optionally be distributed near the top of the structural member 21 and near the bottom of the structural member 21 (i.e., in the cranial-caudal direction) as two options among others. Indeed, it is contemplated to have the mannequin 10 replicate the weight and mass distribution of a human body, whereby the weights 21C may be provided, for instance, in reproducing a mannequin having adult male proportions. It would be contemplated to size a torso system 20 for infant, child, teenager and/or female mannequins as well.

The structural member 21 is configured to support a ribcage formed of ribs 22 and, optionally, ribs 22'. The ribs shown as 22 are of the type that may collapse inwardly and have rotational capacity, while lower ribs 22' may not have this capacity. Typically, when reanimation procedures are performed, chest compressions are conventionally applied at the location of the collapsible ribs 22. It is nevertheless considered to allow the ribs 22' to be collapsible as well. In an embodiment, the ribcage is collapsible by up to 2.75 inches, as depth of compression or excursion.

The ribs 22 and 22' are shown as pairs of mirrored C-shaped components with a gap between them, and cantilevered from the structural member 21. The collapsible ribs 22 may each have a posterior rib member 22P rigidly connected to the structural member 21. Anterior rib members 22A are connected to the free ends of the posterior rib members 22P by way of common pivots 23P, which may be rods, i.e., one left-side rod and one right-side rod. Individual pivots are also an option, with each anterior rib member 22A pivotally connected to a respective posterior rib member 22P. Other arrangements are possible, such as two or more anterior rib members 22A sharing a pivot rod. As a result, the anterior rib members 22A may pivot or move relative to the posterior rib members 22P. As an alternative to pivots, a flexure member may be provided between anterior rib member 22A and respective posterior rib member 22P.

In an embodiment, all anterior ends of the anterior rib members 22A on one side of the torso system 20 (i.e. left or right side) are interconnected by a common pivot 23A, in similar fashion as the pivots 23P. Accordingly, the ribs 22 may move jointly when a pressure is applied thereon. Individual movement is also considered for the ribs 22. The anterior ends of the anterior rib members 22A may also be connected to a chest plate in other ways.

A shock unit 24 has a first end connected to the structural member 21. The shock unit 24 projects anteriorly to a region adjacent to the anterior ends of the anterior rib members 22A. The shock unit 24 may be made of a spring and of a damper, or other system, to offer both resistance and compliance to compressive forces, to then return to an initial position. Stated differently, the shock unit 24 is configured to be compressed to then return to its original shape. As an alternative to the spring and damper, a pad or member of a resilient material may be used, or the spring could be smaller than as illustrated. Moreover, the shock unit 24 may be optional, or there may be more than one shock unit 24. Another expression to define the shock unit 24 is a resilient unit or member, or spring-back unit or member.

Figure 2:
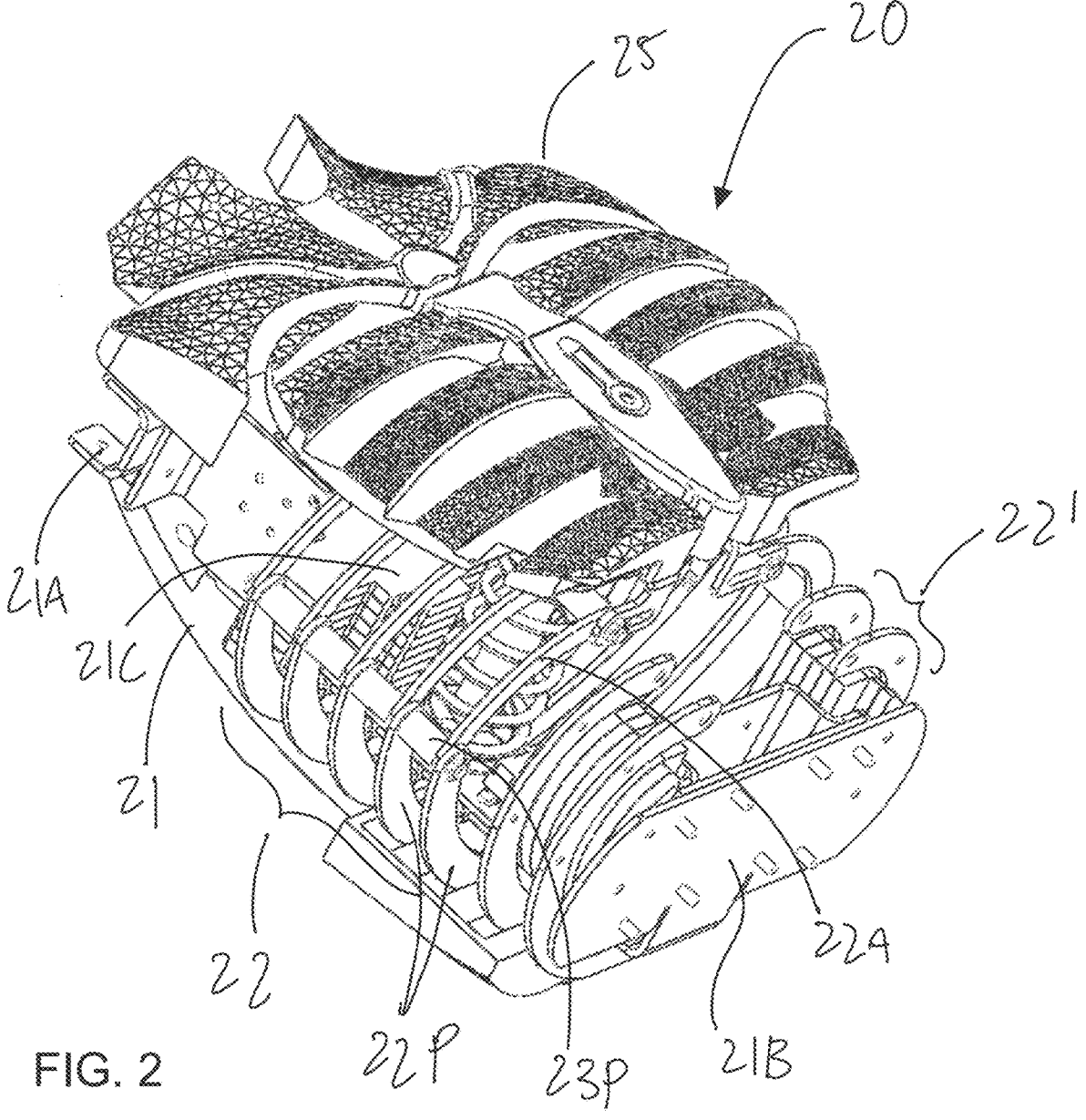
FIG. 2 is a perspective view of a torso system in accordance with the present disclosure.
Figure 3:
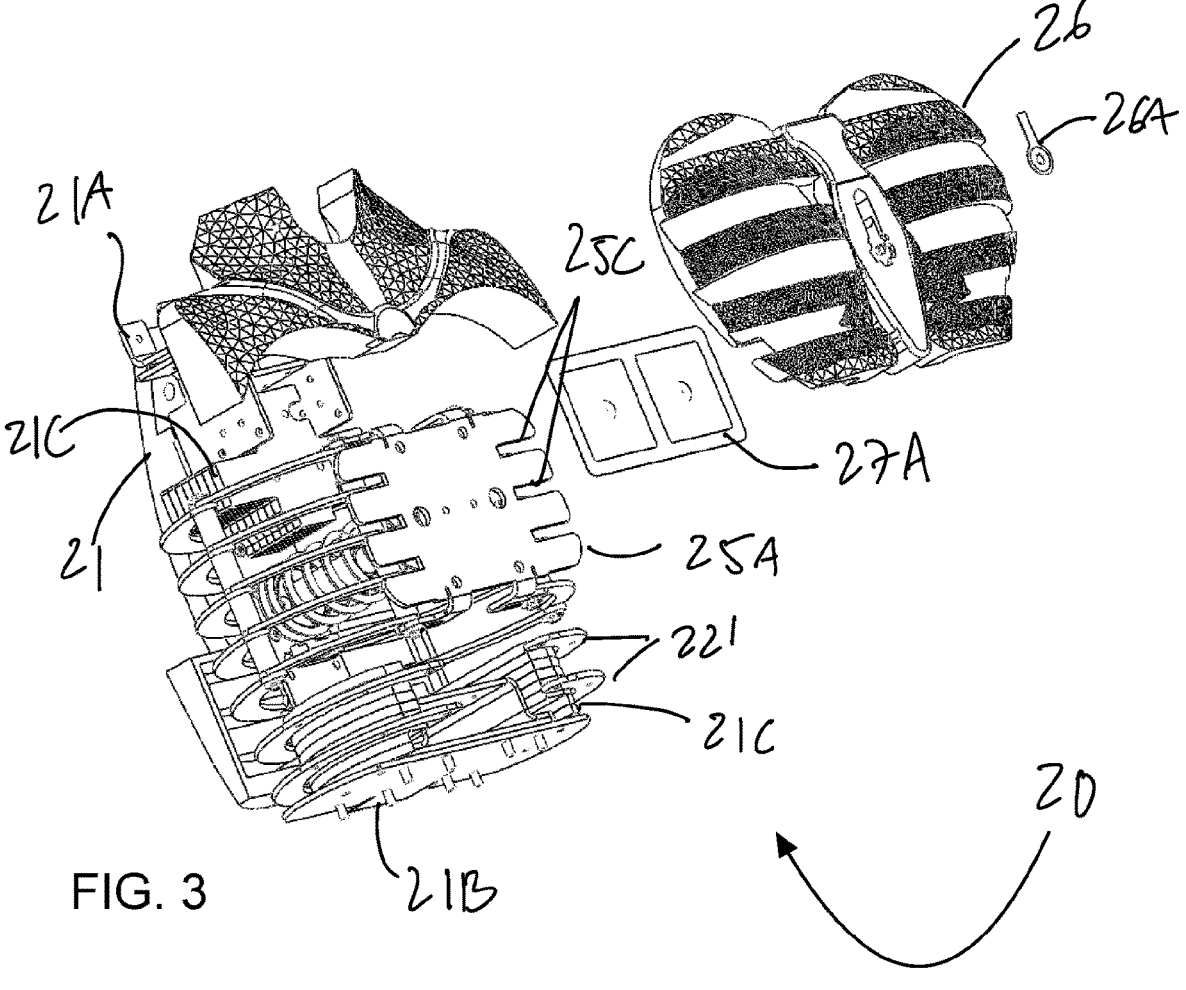
FIG. 3 is an assembly view of the torso system of FIG. 2.
Figures 4, 5:
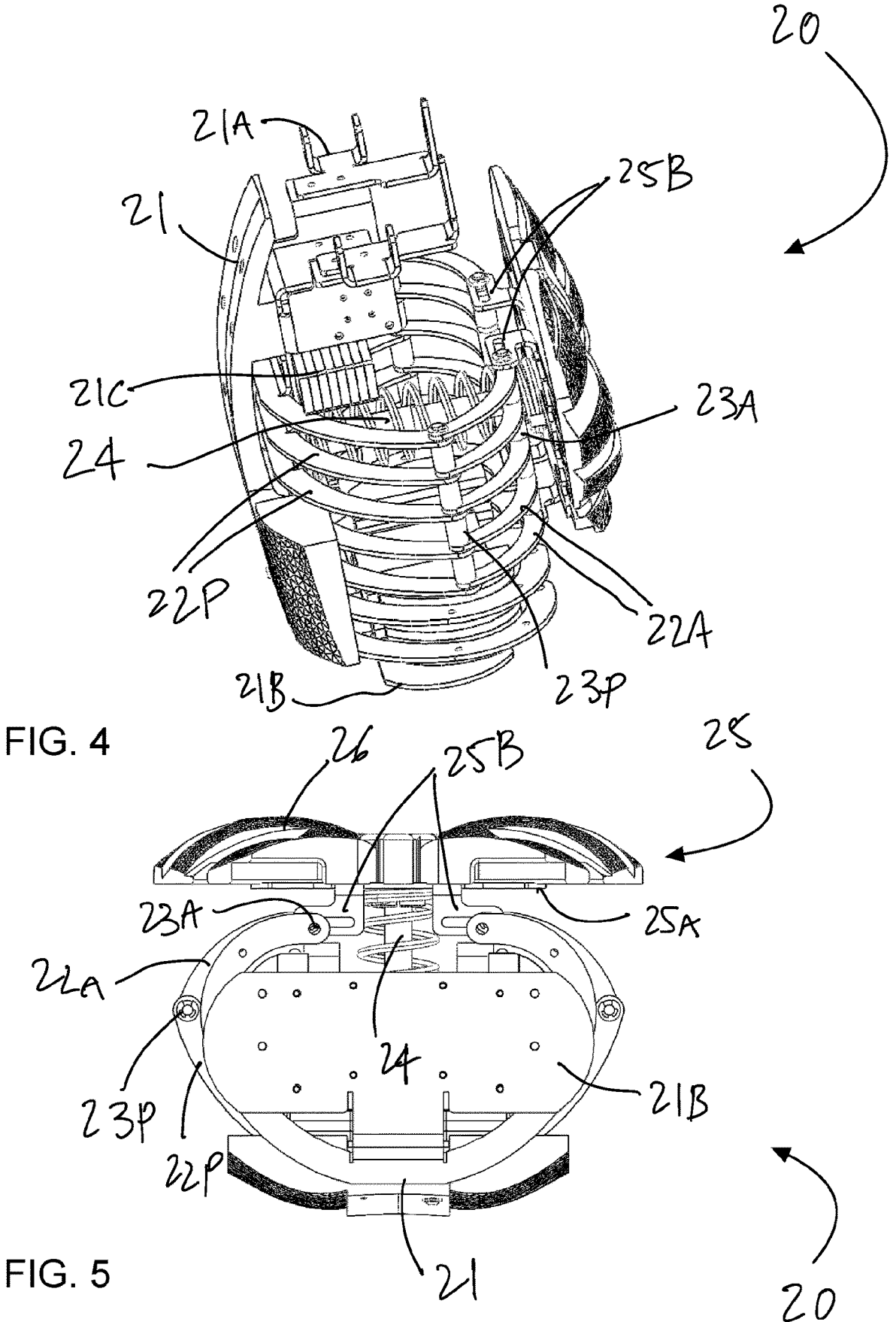
FIG. 4 is a side perspective view of the torso system of FIG. 2.
FIG. 5 is a bottom view of the torso system of FIG. 2.
Figure 6:
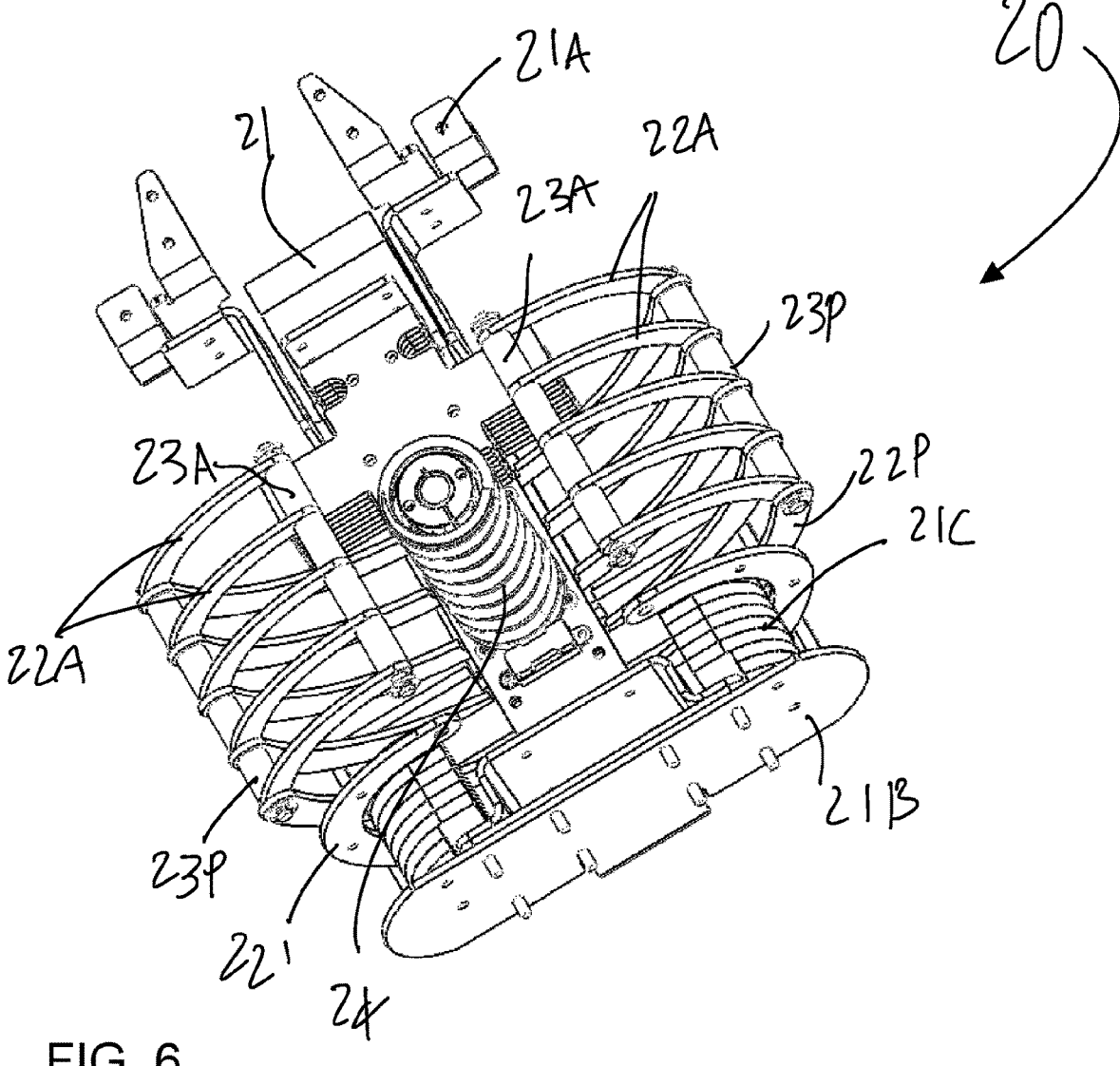
FIG. 6 is a perspective view of the torso system of FIG. 2, with a chest plate assembly removed.
Figure 7:
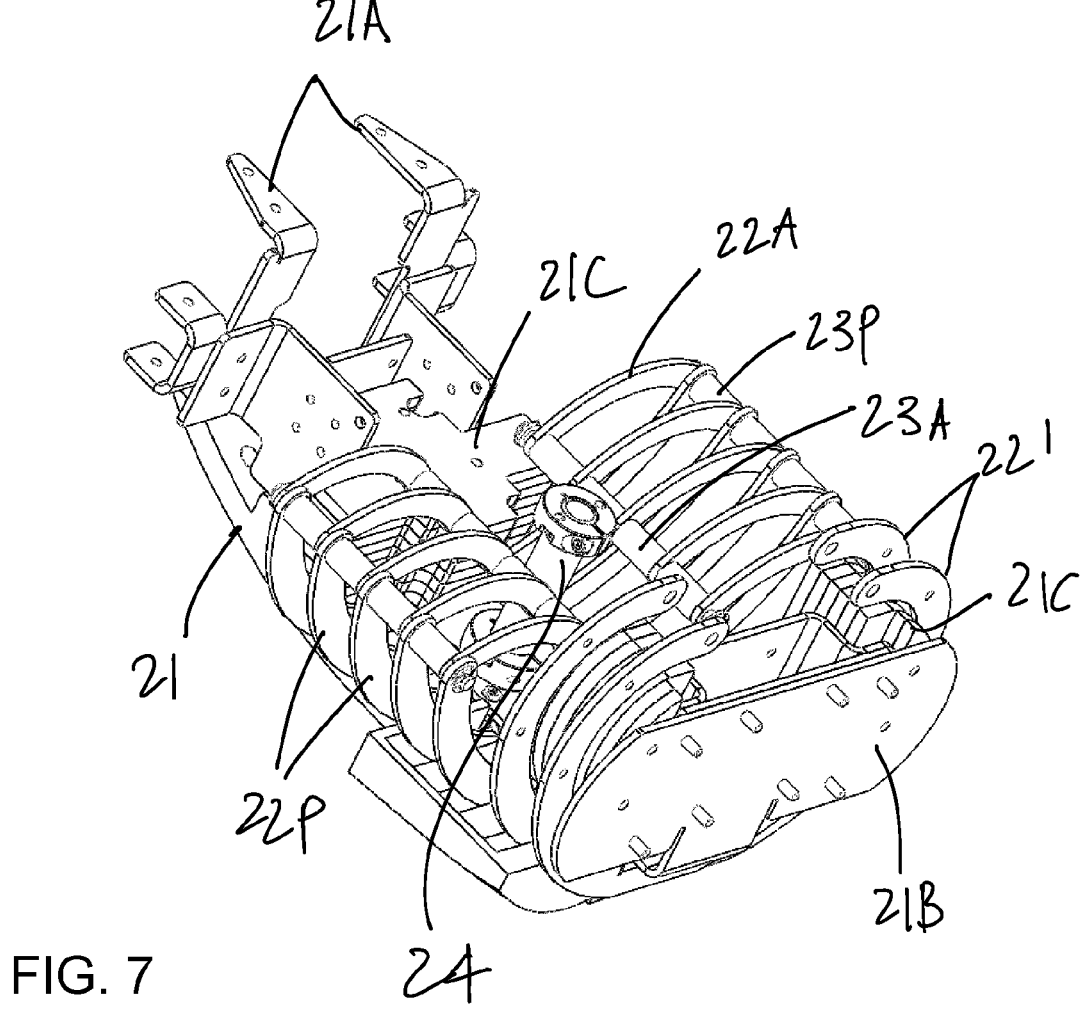
FIG. 7 is a perspective view of the torso system of FIG. 6, with ribs collapsed.
Figure 8:
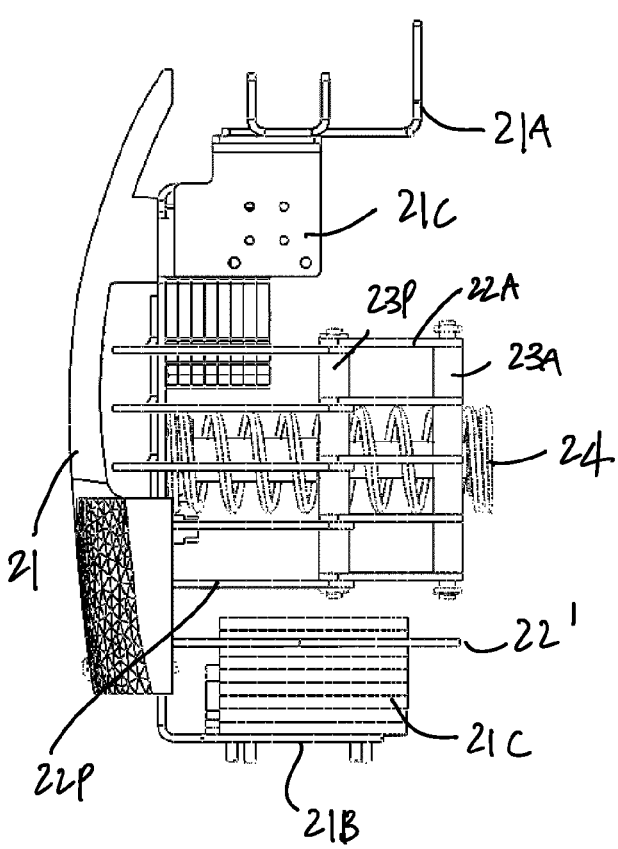
FIG. 8 is a side elevation view of the torso system of FIG. 6.

Referring to FIGS. 2 and 3, a chest plate assembly 25 is shown being interconnected to the ribcage made of the ribs 22 in a manner described below, in addition to be mounted onto the shock unit 24. Other arrangements are possible, such as by having the chest plate assembly 25 connected solely to the ribs 22 with the ribs 22 connected to the shock unit 24, or by having the chest plate assembly 25 connected solely to the shock unit 24, with the ribs 22 connected to the shock unit 24 as well. In other embodiment, the spring-back effect is provided by springs or like biasing members in the rib cage, such as at the pivots 23P. The chest plate assembly 25 may include various components to emulate a human chest. A male chest is shown but a female chest could also be provided. The chest plate assembly may include a rigid structural member 25A by which it is connected to the shock unit 24. For instance, the structural member 25A is in the form of a plate, a grill, a frame, that has the necessary structural integrity to resist to compression forces. As best shown in FIGS. 4 and 5, the structural member 25A may have brackets 25B by which it is connected to the pivots 23A at the free ends of the anterior rib members 22A. For example, the brackets 25B of the structural member 25A may have slots so as to form joints allowing the movement therebetween. Springs could be in such slots to oppose a biasing force and could hence be an alternative to the shock unit 24. The pivots 23A may translate and rotate relative to the brackets 25B, i.e., two degrees of freedom of movement may be possible, though fewer or more are also contemplated. The structural plate 25A may also have slots 25C (FIG. 3), aligned with the anterior rib members 22A. This arrangement is such that constraints are imposed on the movement of the structural member 25A, when compressions are made, as the structural member 25A is interconnected with the pivots 23A on both left and right side of the ribcage. Moreover, the structural plate 25A may move below a top surface of the anterior rib members 22A, via the slots 25C. It may thus allow an operator to manually feel the ribs 22, when applying a compressive force on the torso system 20. Moreover, the arrangement of the ribs 22 with the position of the pivots 23A relative to the structural plate 25A is such that a misplaced pressure may result in the ribs 22 blocking a compressive movement. In an embodiment, the ribs 22 may project anteriorly beyond the chest member 26 only if an excessive pressure is applied to a chest member 26.

The structural plate 25A may then support the soft-tissue chest member 26. The soft-tissue chest member 26 has the shape and feel of human soft-tissue, by a soft-tissue membrane. The chest member 26 may be constituted of different layers to be rigidly connected to the structural plate or frame 25A, and to anteriorly expose equivalents of soft tissue. For example, the chest member 26 may be a combination of urethane and PLA (e.g., printed), as two of numerous possible materials that may be used. Silicone, polyurethane foam is another material that can form part of the layers of the chest member 26, while a metal or high density polymer may be used for the skeleton members. Accordingly, the elastic deformation of the chest member 26, if present, may allow a user to fell the ribs 22 during chest compresses. An upper torso portion is shown, separate from the chest member 26, but contributing to forming the anatomical-like chest of the mannequin 10.

One or more sensors may be provided in the chest plate assembly 25, to quantify human maneuvers on the torso system 20. For example, a sensor 26A may be located in a region where CPR compressions are typically applied. In an embodiment, the sensor 26A is a force-sensing resistor at hand placement on the chest member 26. Other types of sensors may be used, such as inertial sensors (e.g., accelerometers), infrared sensors, strain gauges, etc, to measure accelerations and/or forces associated with the maneuvers made on the chest of the torso system 20, as well as depth and rhythm of compressions. For example, the sensors may have the capacity to detect excessive compressive forces applied in a CPR simulation procedure.

Figure 18:
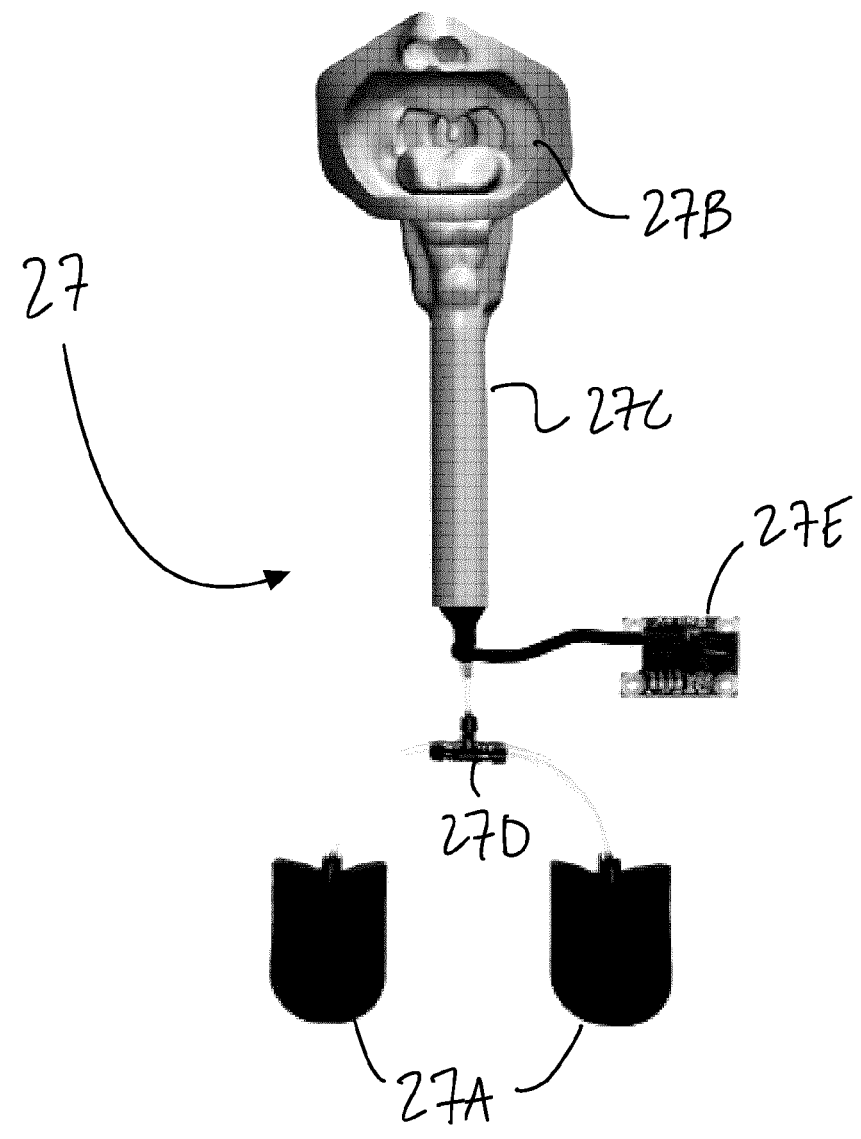
FIG. 18 is a schematic view of an airway simulator apparatus used with the mannequin of the present disclosure.

In an embodiment, an airbag 27A or airbags 27A of an airway simulator apparatus 27 may be located between the structural plate 25A and the chest member 26. The airbag 27 may be provided with a pair of inflatable vessels, to emulate both right and left lungs. The positioning of the airbag(s) 27A is such that when it inflates, it allows chest rises and contractions. The airbag 27A may be in fluid communication with an airway simulator apparatus, such as described in PCT Application Publication No. WO 2019/075582, with the airway simulator apparatus being accessible through a mouth or nostrils of the mannequin 10. For example, as shown in FIG. 18, the airway simulator apparatus 27 may emulate anatomical airways, with a mouthpiece 27B, a throat tube, a pharyngeal tube, nose tube(s), and/or tracheal tube(s) 27C, in fluid communication with the airbag 27A or like lung emulating vessel(s). The tube 27C is sized to allow intubation in one embodiment. In an embodiment, a pharyngeal tube extends into the torso system 20. Though it bears the moniker "pharyngeal", the pharyngeal tube may be longer than an anatomical pharynx. In the variant of FIG. 18, the airway simulator apparatus 27 is shown having a pair or airbags 27 connected to a tube 27C, by a tee 27D or equivalent connector. A pressure sensor 27E may be present, to measure the pressure in the airway simulator apparatus 27. Accordingly, reanimation techniques may be quantified by way of pressure measurements. The pressure sensor 27E may be located at other locations as well, with signals sent to the processor 100 (FIG. 1).

Figure 9:
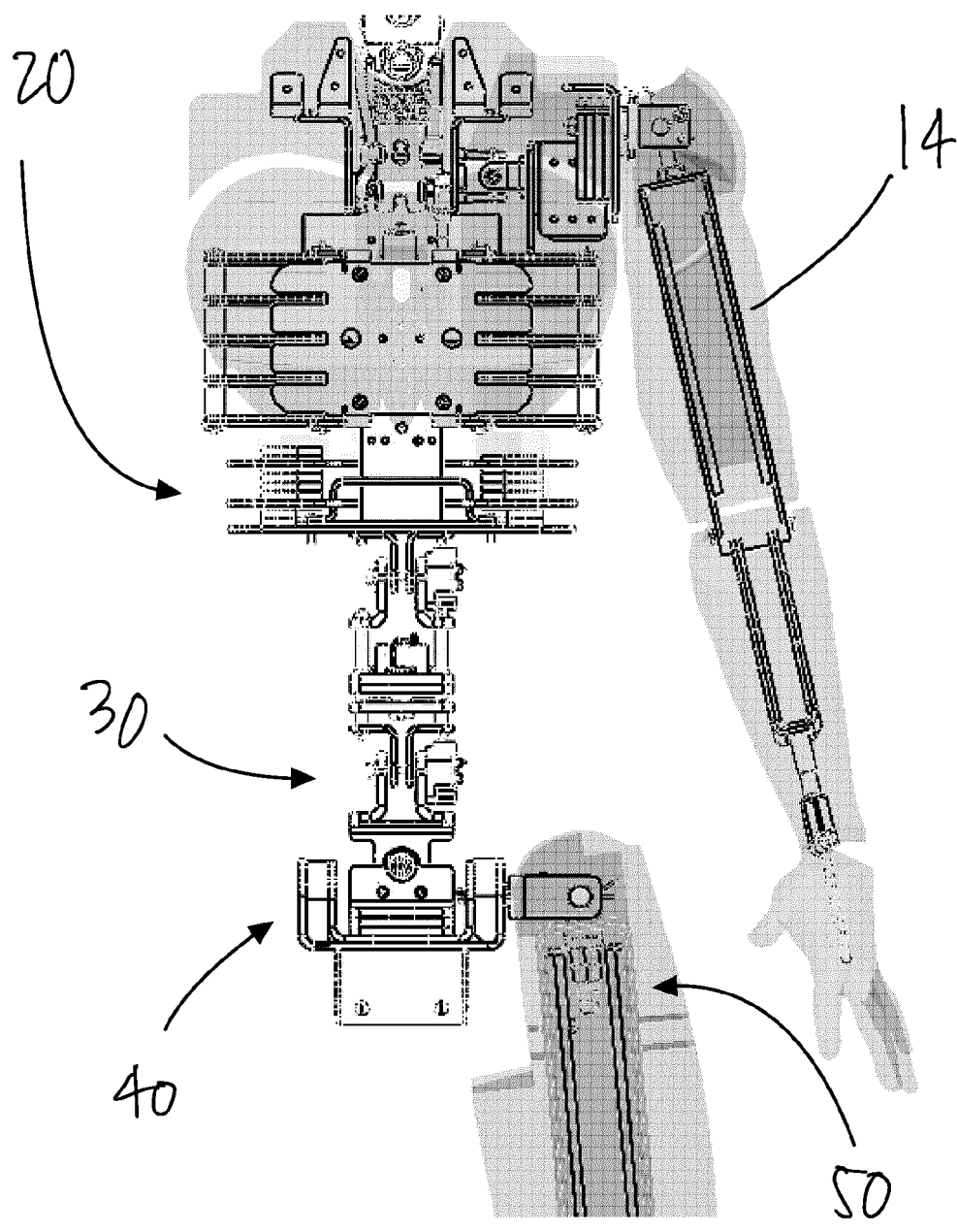
FIG. 9 is a front view of the torso system of FIG. 2 as connected to a lumbar spine system in accordance with a variant of the present disclosure.

Referring to FIG. 9, the torso system 20 is shown relative to the arm 14. The arm 14 may be connected to one of the connectors 21A of the structural member 21 and be arranged to pivot inwardly when pressure is applied to the torso system 20. Any appropriate joints may be provided at the junction between the torso system 20 and the arms 14, to emulate the rotational capabilities of the shoulder joint relative to the torso system 20.

Referring now to FIGS. 9 to 11B, one variant of the lumbar spine system 30 is connected to the torso system 20, for instance at the base plate 21B. The lumbar spine system 30 includes a lumbar spine mechanism configured to emulate a reaction of the lumbar region of the spine, and its freedoms of movement.

Figures 10A, 10B:
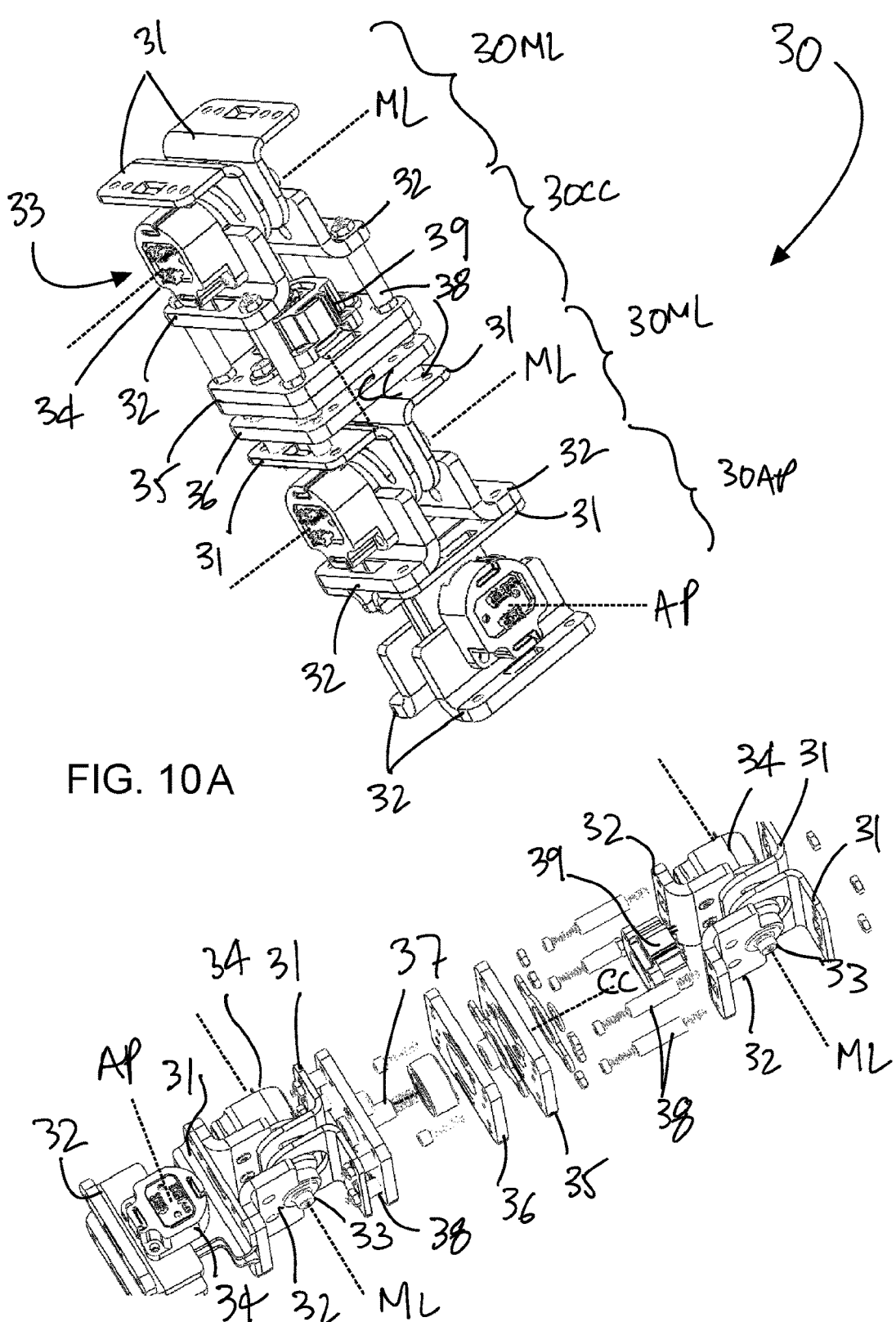
FIG. 10A is a perspective view of the lumbar spine system of FIG. 9.
FIG. 10B is an assembly view of the lumbar spine system of FIG. 9.
Figures 11A, 11B:
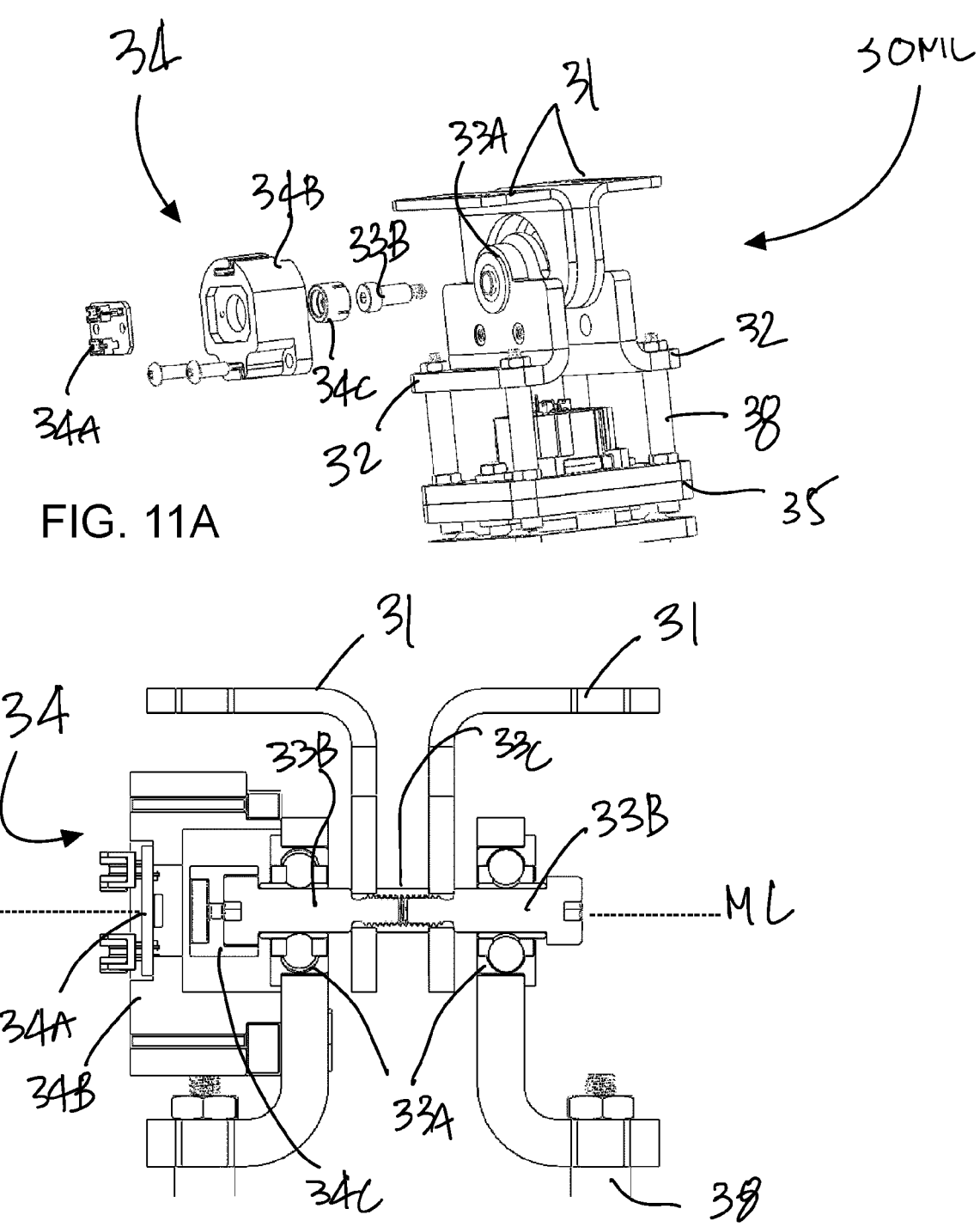
FIG. 11A is an assembly view of a vertebra portion of the lumbar system of FIG. 9.
FIG. 11B is a front elevation view of the vertebra portion of FIG. 13.

In an embodiment, the lumbar spine system 30 may have a sequence of rotational joints 30ML, 30CC, and 30AP with ML referring to mediolateral, CC referring to cranial caudal and AP referring to anterior posterior. In FIG. 10A, the ML (flexion), the AP and the CC axes are shown with the lumbar spine system 30 having two joints 30ML and one of each of the joints 30CC and 30AP. Each joint may provide one rotational degree of freedom, about their related axes. Other arrangements are however contemplated. Additional segments could be used, for instance to reproduce all of the vertebral segments of the spine. Sensors other than encoders could be added to the spine system, such as sensors to capture pressures and forces applied to a vertebral system during manual adjustment and/or manipulation of the mannequin.

Referring concurrently to FIGS. 10B-11A, the joints 30ML and 30AP have a similar construction, whereby only one of these will be detailed. However, similar reference numerals are used to indicate like parts. The joints 30ML and 30AP have connector brackets 31 and 32 pivotally connected by pivot assembly 33, best seen in FIG. 11B. As observed, the pivot assembly 33 may include one or more bearings 33A, supports for the bearings, and a shaft 33B (e.g., bolt and nut, screw, etc). In the arrangement of FIG. 11B, the shaft features a pair of fasteners 33B interconnected by a coupling nut 33C, as one possible arrangement among others. The pivot assembly 33 is aligned with either the mediolateral axis ML (for joint 30ML) or the anterior posterior axis AP (for joint 30AP), thus depending on the nature of the joint. The connector brackets 31 and 32 have fastener holes so as to be secured to the adjacent joint or to the adjacent component such as the base plate 21A or pelvis 40. A sensor assembly 34 may be provided for one or more of the joints 30ML, 30AP, 30CC, with the possibility of having each said joint equipped with a sensor assembly 34 to measure a rotation in the joints. The sensor assembly 34 may be an encoder type sensor as an assembly among others. Hence, in an embodiment shown in FIG. 11A, the sensor assembly 34 may include a PCB board 34A, a holder 34B, a magnet holder 34C featuring magnets and a screw (shaft 33B), as one possible configuration. Thus, the sensor assembly 34 may be provided as one possible sensor arrangement to determine the amount of rotation occurring when the lumbar spine system 30 is displaced.

Referring to FIGS. 9-11B, the joint 30CC is of different configuration as its rotational axis is longitudinally aligned with the lumbar spine system 30, contrary to the joints 30 ML and 30AP that have their axes transversely arranged. The joint 30CC has a connector plate 35 and a connector plate 36, interconnected by a pivot assembly 37. A bearing 37A and shaft 37B may also be present to facilitate movement of the connector plates 35 and 36 relative to one another. In order to connect the connector plates 35 or 36 to the adjacent connector brackets 31, 32 of other joints, struts 38 may be used. The struts 38 may be bolts, fasteners, posts, etc. A sensor assembly 39, which may be the same as the encoder assembly 34 but arranged for the orientation of the joint 30CC, encoder 39 is connected to the pivot assembly 37 as one possible type of sensor to determine the amount of rotation sensed between the connector plates 35 and 36.

Therefore, in the illustrated embodiment of FIGS. 10A-11B, the lumbar spine system 30 has four different joints allowing four different rotational degrees of freedom, two in flexion, one cranial-caudal and one anterior-posterior, though many more degrees of freedom could be present. There may be fewer degrees of freedom, such as three degrees of freedom with the possibility to cover all three rotational axes, i.e., flexion, cranial-caudal and anterior-posterior. Other configurations are considered as well.

Figure 12:
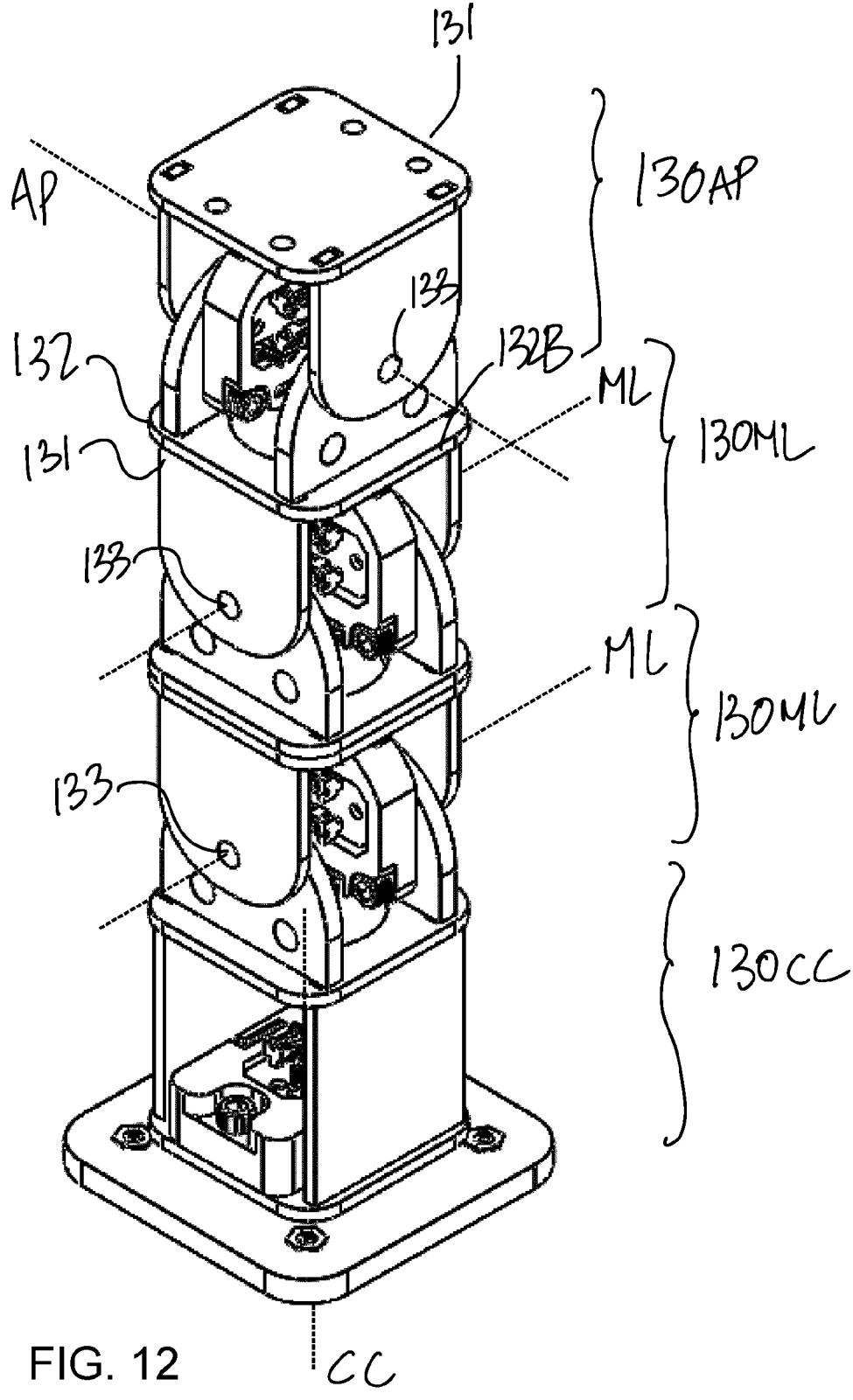
FIG. 12 is a perspective view of a lumbar spine system or cervical spine system of in accordance with another variant of the present disclosure.
Figure 13A:
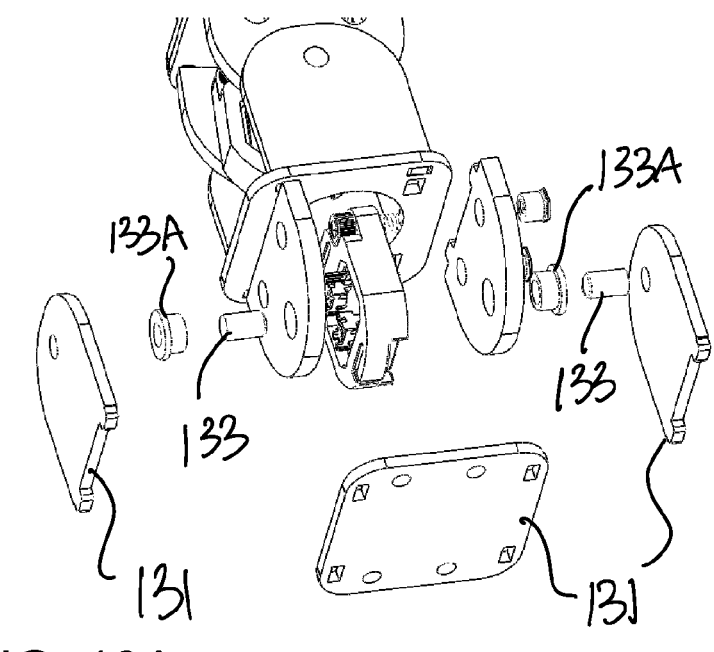
FIG. 13A is an assembly view of a vertebra portion of the lumbar system of FIG. 12.
Figure 13B:
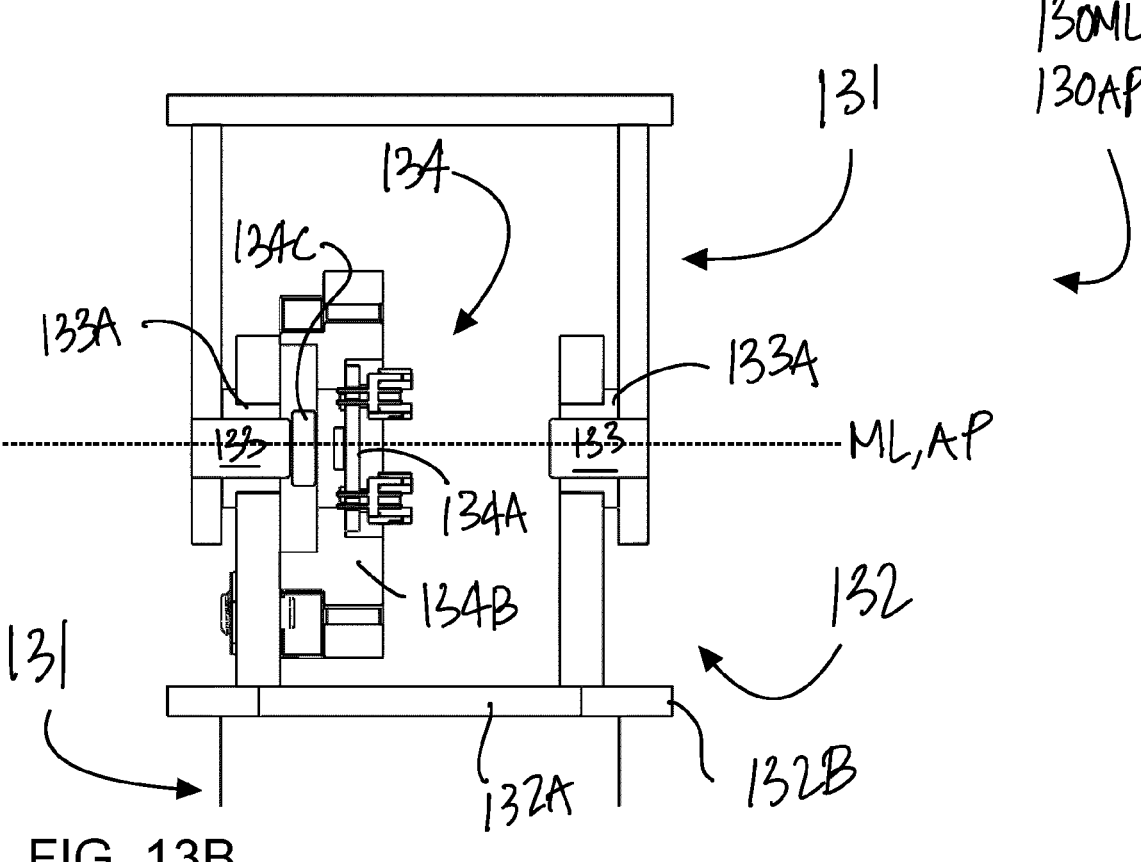
FIG. 13B is an elevation view of the vertebra portion of the lumbar system of FIG. 12.
Figure 13C:
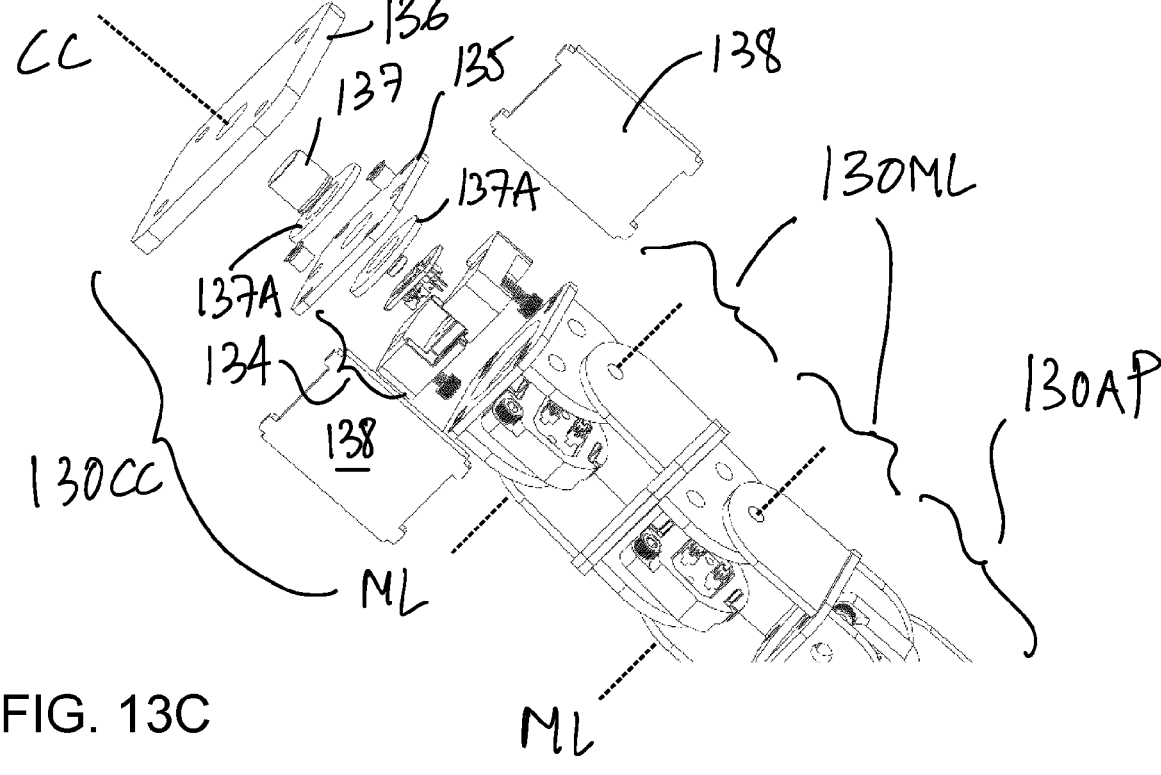
FIG. 13C is an assembly view of a vertebra portion of the lumbar system of FIG. 12.

Referring now to FIGS. 12 to 13C, another variant of the lumbar spine system is shown at 30, and may be connected to the torso system 20, for instance at the base plate 21B in a similar fashion as the lumbar spine system of FIGS. 10A-11B. The lumbar spine system 30 includes a lumbar spine mechanism configured to emulate a reaction of the lumbar region of the spine, and its freedoms of movement. The lumbar spine system 30 could be used as a cervical spine system as well.

In an embodiment, the lumbar spine system 30 may have a sequence of rotational joints 130ML, 130CC, and 130AP with ML referring to mediolateral, CC referring to cranial caudal and AP referring to anterior posterior. In FIG. 12, the ML (flexion), the AP and the CC axes are shown with the lumbar spine system 30 having two joints 30ML and one of each of the joints 30CC and 30AP. Each joint may provide one rotational degree of freedom, about their related axes. Other arrangements are however contemplated, e.g. one joint for each of the CC, AP, ML axes, more than one joint for any of the CC, AP, ML axes, different sequences as opposed to the one shown in the figures. Additional segments could be used, for instance to reproduce all of the vertebral segments of the spine. Sensors other than encoders could be added to the spine system, such as sensors to capture pressures and forces applied to a vertebral system during manual adjustment and/or manipulation of the mannequin.

Referring concurrently to FIGS. 12, 13A, 13B, the joints 130ML and 130AP have a similar construction, whereby only one of these will be detailed. However, similar reference numerals are used to indicate like parts. The joints 130ML and 130AP have connector brackets 131 and 132 pivotally connected by pivots 133, best seen in FIGS. 13A and 13B. The connector brackets 131 and 132 may be U-shaped (i.e., two walls projecting from one base) with the connector bracket 131 being inverted. As the brackets 131 and 132 have their cavities facing each other, a volume is defined to receive components. The brackets 131 and 132 may optionally have bores therein, as shown as 132A. In an embodiment, the brackets 131 and 132 are made of plates that may be welded to each other, so as to define integral brackets. Other arrangements are contemplated, with adhesives, force fits or like mechanical interference. Moreover, a base may be shared by two brackets, such as the base 132B shared between the joints 130AP and 130ML in FIG. 12. It is also contemplated to have two bases back to back, such as between the joints 130ML in FIG. 12.

As observed, the pivots 133 may be paired with one or more bearings 133A, supports for the bearings, shown as being a bushing that may act as a plain bearing. Other arrangements are possible (e.g., bolt and nut, screw, etc). The pivots 133 are aligned with either the mediolateral axis ML (for joint 130ML) or the anterior posterior axis AP (for joint 130AP), thus depending on the nature of the joint. The connector brackets 131 and 132 may have fastener holes so as to be secured to the adjacent joint (e.g., for the joints 130ML) or to the adjacent component such as the base plate 21A or pelvis 40, but welding or other connection arrangements are possible. A sensor assembly 134 may be provided for one or more of the joints 130ML, 130AP, 130CC, with the possibility of having each said joint equipped with a sensor assembly 134 to measure a rotation in the joints. The sensor assembly 134 may be an encoder type sensor as an assembly among others. Hence, in an embodiment shown in FIGS. 13A and 13B, the sensor assembly 134 may include a PCB board 134A, a holder 134B, a magnet 134C fixed to the pivot 133, as one possible configuration. Other sensors may be used as well, including optical sensors, etc. Thus, the sensor assembly 134 may be provided as one possible sensor arrangement to determine the amount of rotation occurring when the lumbar spine system 130 is displaced.

Referring to FIGS. 12 and 13C, the joint 130CC is of different configuration as its rotational axis is longitudinally aligned with the lumbar spine system 130, contrary to the joints 130ML and 130AP that have their axes transversely arranged. The joint 130CC has a connector plate 135 and a connector plate 136, interconnected by a shaft 137. The shaft 137 may be fixed to the connection plate 136 in any appropriate manner (e.g., welding, soldering, mechanical interference, keyway, etc). A bearing 137A, for example a disc(s), may also be present to facilitate movement of the connector plates 135 and 136 relative to one another, in a planar rotation relative to one another. In order to connect the connector plate 135 to the adjacent connector brackets 132 of other joints (such as to the joint 130ML in FIG. 12), walls 138 may be used to form a U-shaped arrangement, or struts (e.g., bolts, fasteners, posts, etc). In the shown arrangement, the joint 130CC has a U-shaped arrangement, with the connector plate 135 and the walls 138, and is connected to a base of the adjacent joint, i.e., of the joint 130ML (though it could be connected to a joint 130AP as well. A sensor assembly 139 may be provided, and may be the same as the encoder assembly 134 but arranged for the orientation of the joint 130CC. Accordingly, the encoder 139 is connected to the shaft 137 as one possible type of sensor to determine the amount of rotation sensed between the connection plates 135 and 136.

The brackets 131, 132, and the one formed by the connection plate 135 and walls 138, as well as the back-to-back brackets 131 and 132 sharing base 132B, and thus forming a H-shaped bracket, may be without bending or bolts, and may thus simplify the assembly of the spine system 30.

Therefore, in the illustrated of FIGS. 12-13C, the lumbar spine system 30 has four different joints allowing four different rotational degrees of freedom, two in flexion, one cranial-caudal and one anterior-posterior, though more degrees of freedom could be present. There may be fewer degrees of freedom, such as three degrees of freedom with the possibility to cover all three rotational axes, i.e., flexion, cranial-caudal and anterior-posterior. Other configurations are considered as well. The spine system of FIGS. 12-13C may define a well or like passage via its bores 132A (131A) that may emulate the vertebral foramen. Accordingly, wires for the various encoders and sensors of the mannequin 10 may pass through this foramen. The foramen of the spine system 30 of FIGS. 12-13C may prevent the damaging of such wires and cables. Moreover, the positioning of the encoder assemblies 134 within the cavities of the brackets 131 and 132 ensures that the cables or wires are closed to a center of the spine system 30.

Figure 14A:
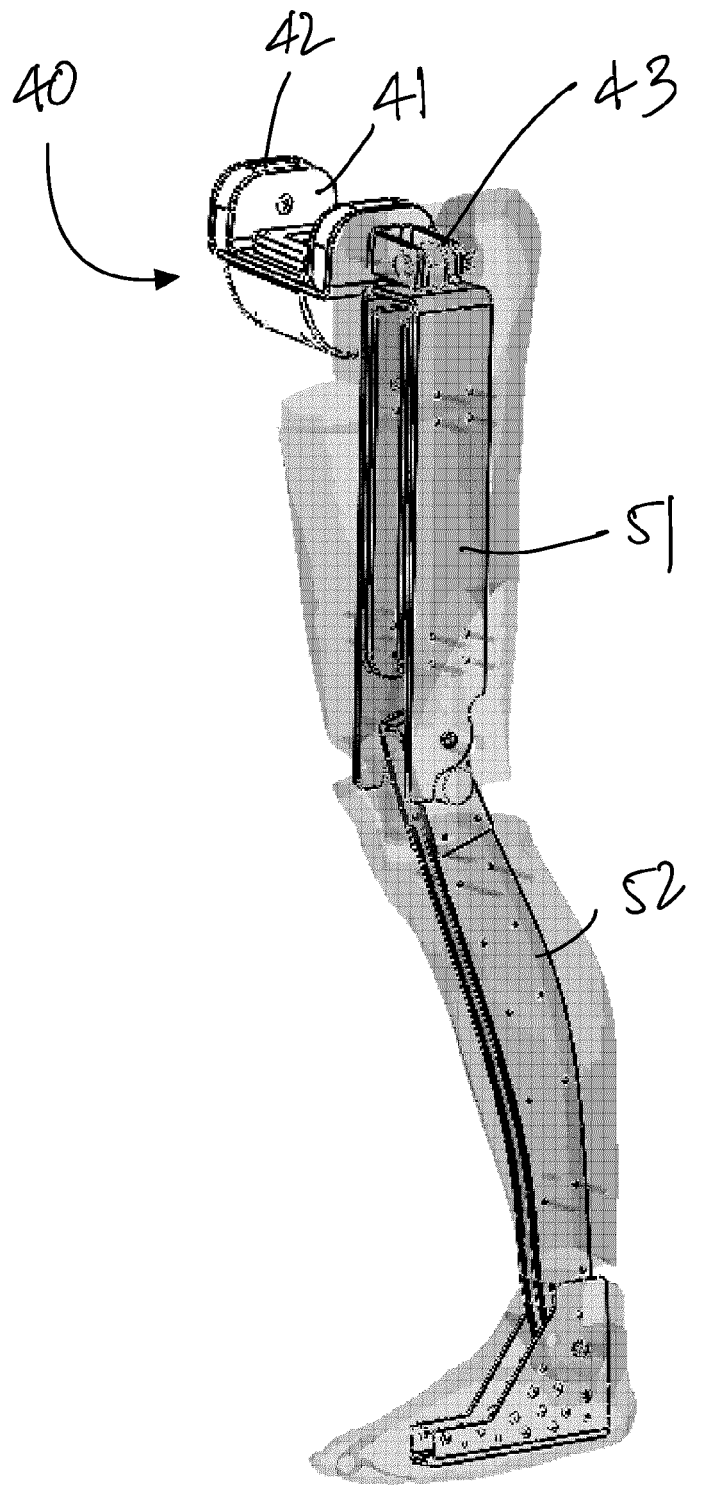
FIG. 14A is a perspective view of a leg and pelvis of the mannequin of FIG. 1 in accordance with another variant of the present disclosure.
Figure 14B:
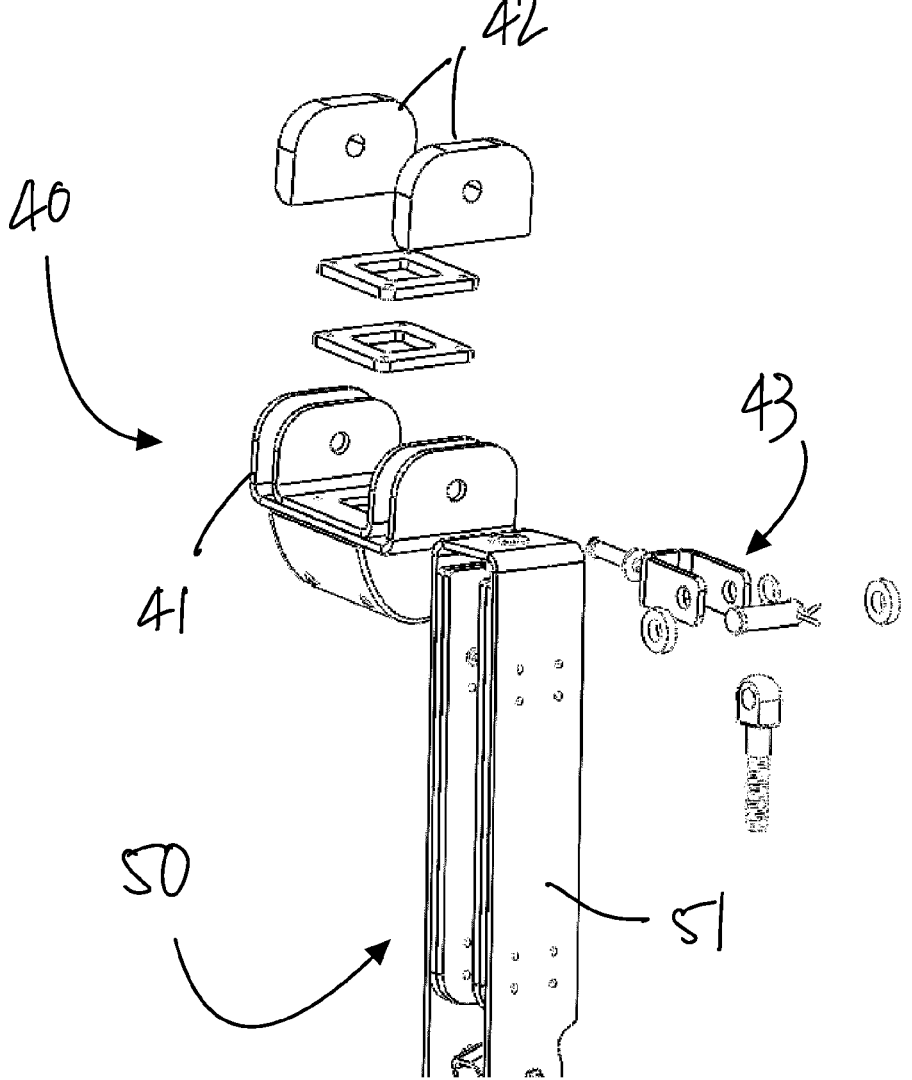
FIG. 14B is an exploded view of the pelvis at a hip region.

Referring to FIGS. 14A and 14B, the pelvis 40 may have a U-shaped structure 41 having a pair of rotational blocks 42. The lumbar spine system 30 is received in the cavity of the U-shaped structure 41. The rotational blocks 42 may serve as rotational pillows for joints between the pelvis 40 and the femur 50. In order to emulate the hip joint, a universal joint 43 may extend from each the blocks 42 and hence provide two rotational degrees of freedom of movement. Other possible joint arrangements include a ball and socket, etc.

The leg 50 may be constituted of a femur 51 and of a tibia 52 (or shank) interconnected by a single rotational degree of freedom via joint 53. More complex joints, with additional degrees of freedom, may be used, if additional functionalities are contemplated for the mannequin 10.

Figures 15A, 15B:
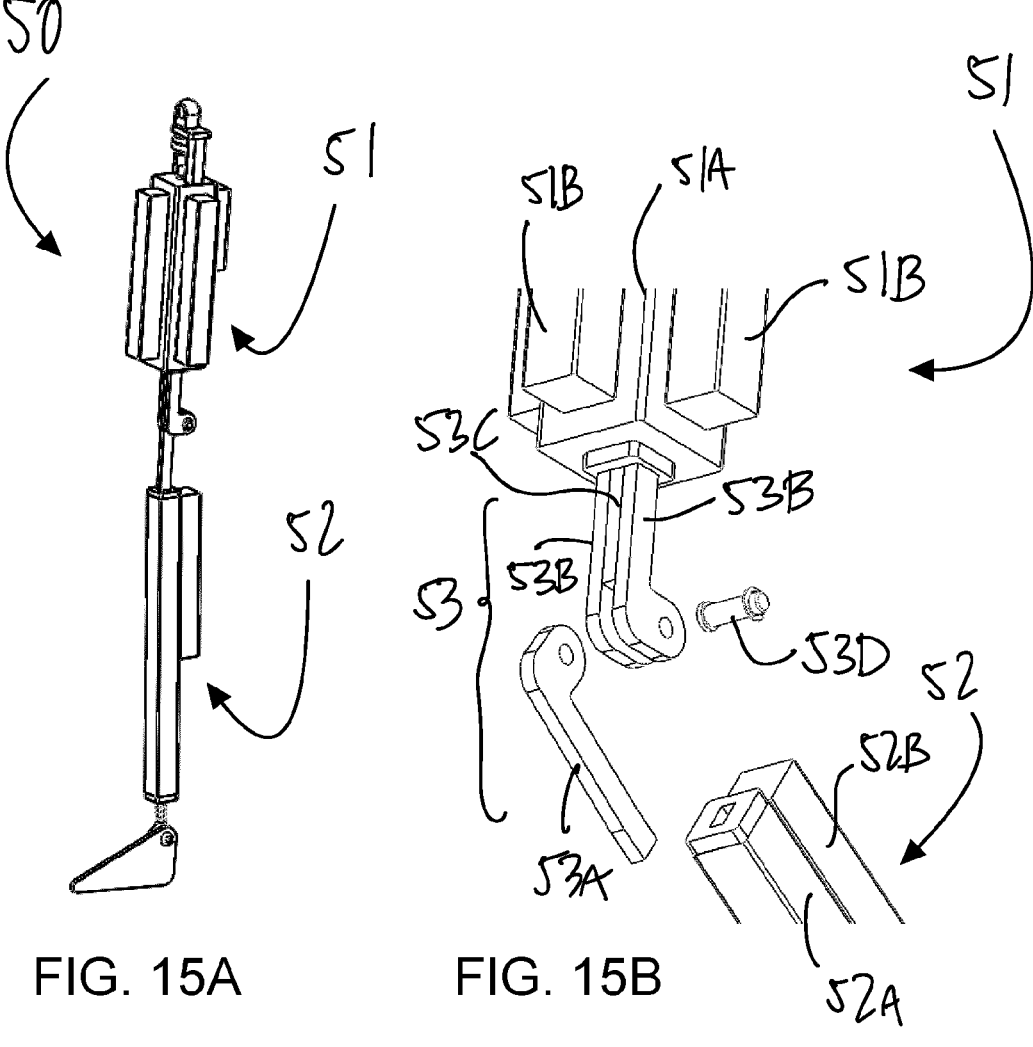
FIG. 15A is a perspective view of a leg in accordance with another variant of the present disclosure
FIG. 15B is an assembly view of a knee joint of the leg of FIG. 15A.

Referring to FIGS. 15A and 15B, another embodiment of the leg 50 is shown with femur 51 and tibia 52 (a.k.a., shank). The femur 51 is made of a central square-section tube 51A with optional peripheral square section tubes 51B. Likewise, the tibia 52 is made of a central square-section tube 52A with optional peripheral square section tubes 52B emulating a calf muscle. The tubes may be welded, bolted, adhered, soldered to one another. The tubes 51A, 51B, 52A and/or 52B may be made of a metal (e.g., steel) to give the leg the inertial of an anatomic leg, as a possibility among others.

The knee joint 53 of FIG. 15B may have a single rotation, or more (e.g., with a universal joint). The size of the knee joint 53 is such that pinch surfaces are minimized. The knee joint 53 may include a plate with tab 53A received in a gap between a pair of plates with tabs 53B, resulting from a shim 53C as an example, with a shaft 53D between these components. The plates with tabs 53A and 53B are received inside a cavity of the tubes 51A and 52A, respectively, with additional hardware to secure these components into a fixed assembly. Circlips may be used on the shaft 53D to facilitate assembly of the knee joint 53.

Figure 16:
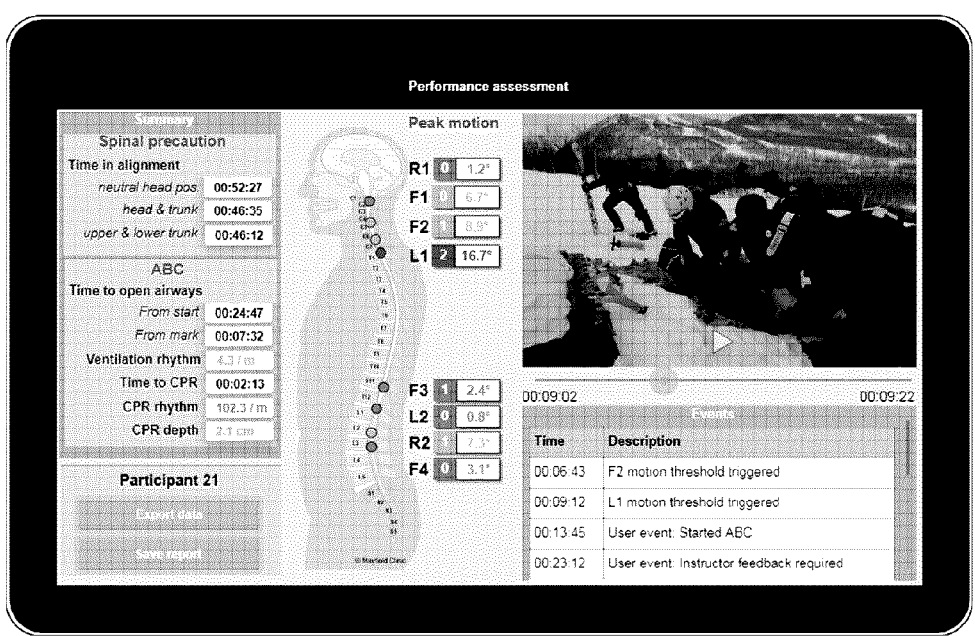
FIG. 16 is a display view of an exemplary GUI used with the mannequin of the present disclosure.
Figure 17:
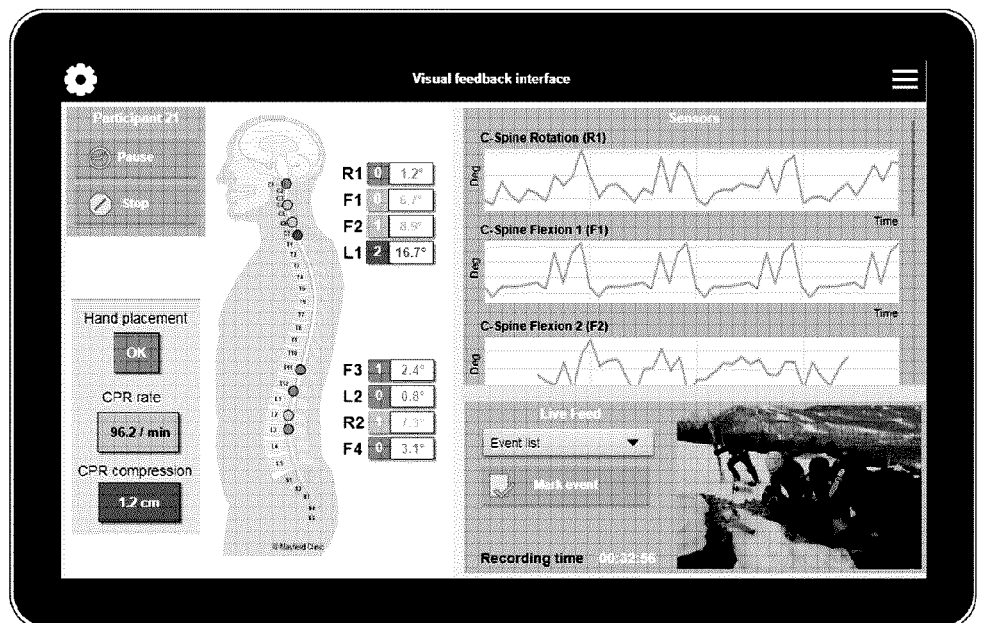
FIG. 17 is a display view of another exemplary GUI used with the mannequin of the present disclosure.

Referring to FIG. 1, the mannequin 10 is of the type having or used with a processing unit 100 used to quantify the manipulations of a mannequin 10, though the mannequin 10 may be a standalone device (e.g., with audio and/or vibratory feedback). The processing unit 100 is of the type having a non-transitory computer-readable memory communicatively coupled to it and comprising computer-readable program instructions executable by the processing unit 100 to perform numerous functions related to the simulation of chest maneuvers, and lumbar spine motions, in addition to functions optionally performed relative to other parts of the mannequin 10. The processing unit 100 receives data from sensors described herein, to measure various movements of the mannequin 10 and other parameters such as forces applied to mannequin 10. An interface may be operatively connected to the processing unit 100 to output quantitative data representative of the transfer manipulations, or CPR maneuvers, and may communicate with the operators of the mannequin 10 to warn or alarm them of excessive or improper manipulations. The interface may be a monitor, screen, tablet, may be embedded into the mannequin, etc. FIGS. 16 and 17 provide exemplary GUIs, that can provide some or all of the following information: CPR rhythm, CPR depth ventilation rhythm, all with respect to a time scale, in addition to all spine rotations based on the sensors in the lumbar spine system 30 and neck, if applicable, for instance as graphs shown angular variations over time (FIG. 17). The GUI may also provide a video display of maneuvers on the mannequin 10, and a list of events.

With respect to the lumbar spine system 30, the processing unit 100 may have an orientation calculator module receiving the data from the sensor assemblies 34 and 39. The orientation calculator module may determine orientation variations sustained by the lower back of the mannequin 10 during manipulations. For example, the orientation calculator module may quantify variations in flexion angle values about one or more flexion axes, about lateral axes of the mannequin 10. The orientation calculator module may also quantify lateral flexions as well, i.e., about an anterior-posterior axis of the mannequin 10. All of these variations of angle values may be in the form of angular rates of change about various axes.

The orientation calculator module may provide an output as a visual display on the interface, or in the form of a data file for any given training session. In accordance with an embodiment, the output is in the form of the graph to indicate the angle or angular rates of change for a user to get a quantitative assessment of manipulations being performed. The graph may have a timescale which can be matched with data pertaining to the various manipulations such that a user may see the angles and angular rates of change resulting from various manipulations.

The processing unit 100 may be programmed with an orientation threshold database so as to determine what constitutes permitted versus excessive manipulations. Hence, the orientation calculator module may provide measured angular rates of change and receive threshold values from the orientation threshold database. A performance assessor may then determine whether the movements performed exceed the values programmed into the orientation threshold database, in which case it may be determined that an excessive or improper transfer manipulation of the mannequin 10 has been performed. The performance assessor module may also be programmed to evaluate CPR parameters, such as excessive or insufficient force, improper CPR rhythm, misplaced forces.

The performance assessor module, when identifying an excessive or improper manipulation by measured values exceeding beyond those expected, may alert the operator of the system 10 via the alert of the interface, or may provide quantitative data relative to accepted values. This is an advantage over methods in which the quantitative data is provided at a later point, in that corrective measures may be taken right away to practice by re-manipulating the mannequin 10 for a proper manipulation. Moreover, the processing unit 100 may have various thresholds to provide more than a binary "proper" vs "excessive" assessment. For example, preliminary signals may be emitted to warn the operators of an impending excessive manipulation, or excessive force, for the operators to correct their movements, for instance by slowing down manipulations, applying lower compressions and/or by reorienting the mannequin 10, accelerating the pace of compressions. Such system interventions may provide real time feedback to the operators during training, for the operators to be capable of understanding the manipulations that are not done correctly.

The processor unit 100 may also have a force evaluating module receiving signals from the sensors to calculate the forces to which the mannequin 10 is exposed. For example, the sensors may include inertial sensors (e.g., accelerometers) producing data indicative of the forces sustained by the mannequin 10 during the CPR procedure. The sensors may include pressure sensors (e.g., manometers) for an airway simulator apparatus.

The invention claimed is:
1. A lumbar spine mechanism for a mannequin comprising:
at least four joint units serially connected to provide joints for at least three rotational degrees of freedom (DOF), with a rotational axis of a first DOF configured to be aligned with a lateral axis of the mannequin, a rotational axis of a second DOF configured to be aligned with an anterior-posterior axis of the mannequin, a rotational axis of a third DOF configured to be aligned with a cranial-caudal axis of the mannequin, and a rotational axis of a fourth DOF is configured to be aligned with the lateral axis of the mannequin, sensors to measure movements at each of the at least three joint units to detect lumbar spine orientation changes, and wherein a bottom one of the at least three joint units is adapted to be connected to a pelvis of the mannequin, and a top one of the at least three joint units is adapted to be connected to a torso section of the mannequin.

2. The lumbar spine mechanism according to claim 1, wherein the bottom one of the at least four joint units is adapted to be connected to the pelvis of the mannequin with the third DOF, such that the lumbar spine mechanism is configured to be connected to the pelvis for rotation about the cranial-caudal axis.

3. The lumbar spine mechanism according to claim 2, wherein, from the pelvis, the at least four joint units sequentially include the third DOF, the fourth DOF, the first DOF and the second DOF.

4. The lumbar spine mechanism according to claim 1, wherein the joint units for the first DOF, for the second DOF, and for the fourth DOF are defined by a pair of U-shaped brackets pivotally connected at ends of the U, with cavities of the U facing each other.

5. The lumbar spine mechanism according claim 4, wherein the U-shaped brackets include three welded plates forming the U.

6. The lumbar spine mechanism according claim 4, wherein the sensors associated with the first DOF, with the second DOF and with the fourth DOF are within the cavities of the U.

7. The lumbar spine mechanism according to claim 4, wherein a pair of adjacent ones of the joint units share a base of the respective U-shaped brackets.

8. The lumbar spine mechanism according to claim 4, wherein a base of the respective U-shaped brackets for at least one of the joint units defines a bore used as a foramen for cables of the sensors.

9. A system for simulating lumbar spine motions, the system comprising:

a mannequin having a lumbar spine mechanism according to claim 1 between a torso and a pelvis;

a processing unit having an orientation calculator module to quantify the lumbar spine orientation changes from readings of the sensors, and a performance assessor module to assess the lumbar spine motions using the quantified lumbar spine orientation changes; and an output for outputting an assessment and/or the lumbar spine orientation changes.

10. A torso system for a mannequin comprising:

a structural member at a back of the mannequin;

ribs connected to the structural member to define a ribcage, at least a first set of the ribs having pivotable portions relative to the structural member;

a chest plate assembly operatively connected to the ribcage for relative movement therebetween; and a shock unit between the chest plate assembly and the structural member.

11. The torso system according to claim 10, wherein the ribs of the first set each have a posterior rib member connected to the structural member, and an anterior rib member pivotally connected to the respective posterior rib member, the anterior rib members being connected to the chest plate assembly.

12. The torso system according to claim 11, wherein the anterior rib members are connected to the chest plate assembly by joints including one translational DOF and one rotation DOF.

13. The torso system according to claim 11, wherein the anterior rib member and the posterior rib member of a left subset of the first set share a common pivot, and the anterior rib member and the posterior rib member of a right subset of the first set share a common pivot.

14. The torso system according to claim 13, wherein the anterior rib members of the left subset share a common pivot for connection to the chest plate assembly, the anterior rib members of the right subset share a common pivot for connection to the chest plate assembly.

15. The torso system according to claim 10, wherein the chest plate assembly has a frame member operatively connected to the ribcage.

16. The torso system according to claim 15, wherein the frame member covered by a membrane emulating soft tissue.

17. The torso system according to claim 10, wherein the structural member includes an arched beam to which the ribcage is connected.

18. The torso system according to claim 10, wherein the ribs of a second set are fixed.

19. The torso system according to claim 10, including an airway simulator apparatus having at least one tube defining at least one opening at a level of a face of the mannequin, and being in fluid communication with at least one airbag in the chest plate assembly.

20. The torso system according to claim 10, further including rotational axes connected to the structural member, and configured for connection of arms to the torso system.

* * * * *